United States Patent
Sisman

(10) Patent No.: US 12,467,173 B2
(45) Date of Patent: Nov. 11, 2025

(54) METHOD FOR PRODUCING A NONWOVEN FABRIC USED AS AN ENGINE HOOD INSULATOR MATERIAL

(71) Applicant: HASSAN TEKSTIL SANAYI VE TICARET A.S., Istanbul (TR)

(72) Inventor: Ahmet Sisman, Istanbul (TR)

(*) Notice: Subject to any disclaimer, the term of this patent is extended or adjusted under 35 U.S.C. 154(b) by 583 days.

(21) Appl. No.: 17/413,717

(22) PCT Filed: Oct. 22, 2019

(86) PCT No.: PCT/TR2019/050887
§ 371 (c)(1),
(2) Date: Jun. 14, 2021

(87) PCT Pub. No.: WO2020/139235
PCT Pub. Date: Jul. 2, 2020

(65) Prior Publication Data
US 2022/0025565 A1  Jan. 27, 2022

(30) Foreign Application Priority Data

Dec. 28, 2018  (TR) ................................. 2018/21007
Sep. 11, 2019  (TR) ................................. 2019/13785

(51) Int. Cl.
*D04H 1/68*  (2012.01)
*D04H 1/48*  (2012.01)
(Continued)

(52) U.S. Cl.
CPC .................. *D04H 1/68* (2013.01); *D04H 1/48* (2013.01); *D04H 1/488* (2013.01); *D04H 1/66* (2013.01);
(Continued)

(58) Field of Classification Search
CPC ........... D04H 1/48; D04H 1/488; D04H 1/66; D04H 1/68
See application file for complete search history.

(56) References Cited

U.S. PATENT DOCUMENTS

| 6,749,929 | B1 | 6/2004 | Enkler et al. |
| 2007/0260014 | A1 | 11/2007 | Ulrich et al. |
| 2017/0044698 | A1* | 2/2017 | Traser ................. C09J 7/35 |

FOREIGN PATENT DOCUMENTS

| EP | 657572 A1 * | 6/1995 | ............... D04H 1/66 |
| EP | 2628837 A1 | 8/2013 | |

(Continued)

OTHER PUBLICATIONS

Russell, S. J.. (2007). Handbook of Nonwovens (1st Edition). Woodhead Publishing Limited (Year: 2007).*

(Continued)

*Primary Examiner* — Carson Gross
(74) *Attorney, Agent, or Firm* — Egbert, McDaniel & Swartz, PLLC

(57) ABSTRACT

A coated nonwoven product used to make engine hood insulation material is produced by a method which involves needle punching a carded, cross-lapped web, then calendering the resulting web and then applying a foam coating. Rotary screen printing is used to apply a dot pattern of an acrylic emulsion to the dried, foam-coated web. Thermoplastic and/or thermoset material is deposited onto the acrylic coating and excess material is removed by vacuum, leaving a corresponding dot coating pattern of said material. The coated web is heated using infrared energy before cooling, cold calendering and winding-up.

14 Claims, 4 Drawing Sheets

(51) Int. Cl.
    *D04H 1/488*  (2012.01)
    *D04H 1/66*   (2012.01)
    *D04H 18/02*  (2012.01)
    *D06C 15/02*  (2006.01)
    *D06C 25/00*  (2006.01)
    *F02B 77/11*  (2006.01)

(52) U.S. Cl.
    CPC ............. *D04H 18/02* (2013.01); *D06C 25/00* (2013.01); *D06C 15/02* (2013.01); *F02B 77/11* (2013.01)

(56) References Cited

FOREIGN PATENT DOCUMENTS

| WO | 03021096 A1 | 3/2003 | |
|----|----|----|----|
| WO | 2004080710 A2 | 9/2004 | |
| WO | WO-2009052861 A1 * | 4/2009 | ............. A41D 27/02 |

OTHER PUBLICATIONS

International Search Report for corresponding PCT/TR2019/050887, dated Apr. 27, 2020.
Written Opinion of the International Searching Authority for corresponding PCT/TR2019/050887, dated Apr. 27, 2020.

* cited by examiner

METHOD FOR PRODUCING A NONWOVEN FABRIC USED AS AN ENGINE HOOD INSULATOR MATERIAL

SUBJECT OF THE INVENTION AND TECHNICAL FIELD

This invention relates to the innovation in the nonwoven textile of an engine hood insulator. The invention particularly relates to the production method which provides advantages in terms of cost, lightness and health (carcinogenic effect) in the process of connecting the two layers of nonwoven-based insulator positioned on the inside of the engine hood, which is used in the automotive industry and consists of two layers. In brief, this method is the production technique about the coating of adhesives used in laminating the first layer with a thinner and lighter second layer which is responsible in protecting the first layer against combustion and substances such as water and oil.

STATE OF THE ART

Today, technical textiles are used in numerous fields. One of these is the automotive industry. In the automotive industry, nonwoven materials are used both in internal components (floor covering, luggage parts etc.) as an upholstery material and in external components as an insulating material.

The purpose of using insulation material in internal combustion engine vehicles is to provide sound and thermal insulation. This insulation material usually consists of two layers: The first layer (the part adhered to the hood) is made up of polyurethane foam or a nonwoven textile containing natural/synthetic fiber (polyester, cotton and glass fibers), and the second layer (the surface seen when the hood is open) is made up of nonwoven fabrics generally produced by needle punching, water jet or spunbond methods. The first layer plays an active role in the sound and thermal insulation while the second layer is responsible for protecting against combustion and substances such as water and oil. Since the insulators used in the state of the art are multi-layered, there are disadvantages such as the weight of the material used, the cost of production and the high carcinogenic effect.

There is an EU patent no. EP2628837 in the state of the art. The said patent discloses an insulation material consisting of nonwoven materials having fibers of different intensity.

Another patent in the state of the art is the U.S. Pat. No. 6,749,929. The invention of the said patent is an insulating material comprising layers obtained by coating a duroplastic foam on materials such as glass fiber, carbon fiber, polyester fiber, ceramic fiber, and then coating it by at least one nonwoven material.

Another patent in the state of the art is the international patent application no WO2004080710. An automotive internal component obtained with different layers of fiber materials is disclosed in this patent. It is mentioned related to the said material that it is generally used for thermal and sound insulation of the vehicle.

In the state of the art, there are numerous engine hood insulator materials produced with the nonwoven production technique comprising natural or synthetic materials. However, mostly these are either thicker or they contain high amount of carcinogenic substances or they are expensive due to the cost of the used material is high.

TECHNICAL PROBLEMS TO BE SOLVED BY THE INVENTION

The object of the invention is to eliminate the structure of the nonwoven-based engine hood insulators seen in the state of the art that has high production cost and carcinogenic substance content and instead, obtain an efficient structure that costs less, and where the carcinogenic material content is minimized.

One of the advantages of the insulator of the present invention is coating the nonwoven material in semi-finished form (the product obtained after completing stage 110) with the thermoplastic or thermoset material in powder form by a scattering method after the fixing procedure in stage 110, and obtaining a lighter, low-cost and less hazardous (to health) insulator by using less production material through vacuuming a specific part of the material (those not adhering to the polymer emulsion applied by rotary screen printing) with vacuum technologies.

Another advantage of the insulator of the present invention is the reduced cost as the thermoplastic or thermoset coating comprises a part of the surface due to the vacuuming process.

Another advantage of the insulator of the present invention is that a product that is less hazardous to humans and the environment as the carcinogenic substance containing thermoset material (such as phenol etc.) being used less on the second layer during the lamination of the first and the second layer.

In order to better understand the system of the present invention, the following figures will be utilized.

REFERENCE NUMBERS OF SECTIONS, PARTS AND STEPS FOR DESCRIPTION OF THE INVENTION

1—Semi-finished nonwoven
2—Acrylic material
3—Thermoplastic and/or thermoset
4—Acrylic-coated ridges
5—Surface without acrylic 6—Second layer
7—Template
8—Powder scattering unit
9—Vacuuming unit
10—Infrared oven
10—Bale opening
20—Blending
30—Dosing
40—Carding
50—Cross laying
60—Drafting
70—Needle punching
80—Calendering
90—Application of chemicals by foaming
100—Pre-drying
110—Drum drying
120—Partial surface coating
130—Infrared heating
140—Cooling
150—Passing through cold calender
160—Winding
200—Application of acrylic on semi-finished nonwoven fabric
210—Scattering thermoplastic and/or thermoset powder on the acrylic coated semi-finished nonwoven fabric
220—Vacuuming a part of the powder material from the thermoplastic and/or thermoset-coated semi-finished nonwoven fabric
230—Fixing the thermoplastic and/or thermoset on the surface in the form of spots by heating
240—Passing through cold calender and shaping
250—Winding the second layer of the insulation material

DETAILED DESCRIPTION OF THE INVENTION

The insulation material of the present invention is a nonwoven-technical textile essentially used in engine hoods. Said insulation material can both be produced inline by being combined with nonwoven production techniques and offline by being handled as a separate process after the production in a semi-finished form. The invention comprises a process for the production of the second layer of the insulation material in hood insulators used in the automotive industry.

Figure 1:
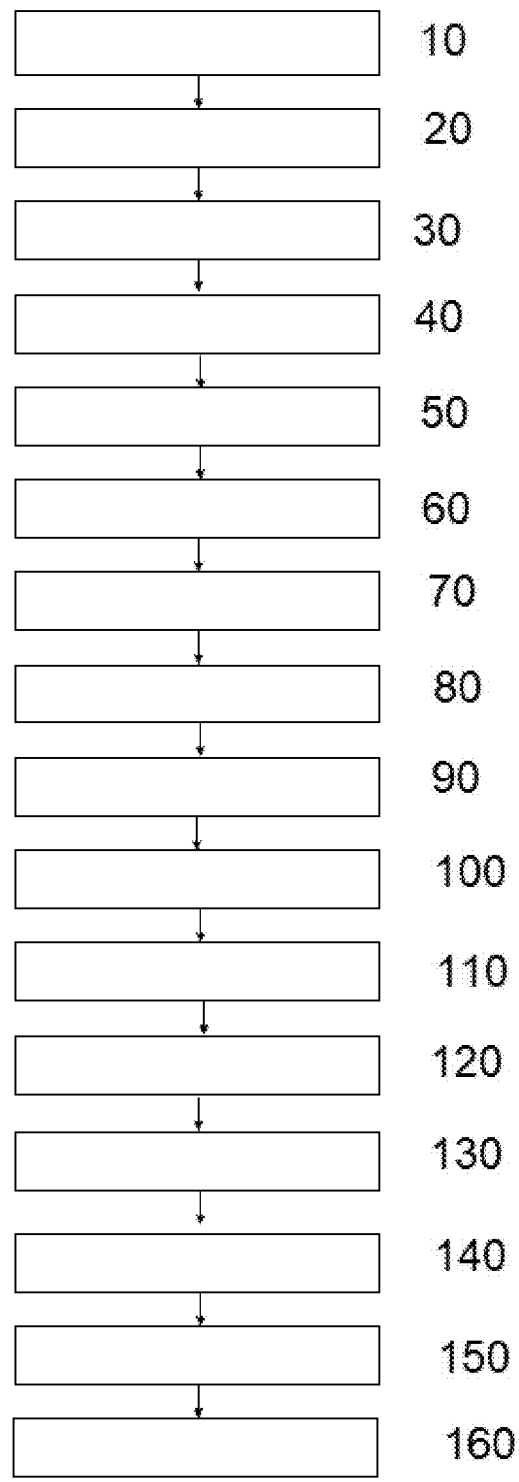
FIG. 1 is the flow chart showing the production process from the raw material of the second layer of the insulator material of the present invention to the end product.

The insulation material of the present invention is obtained by being passed through basic stages in the production process of FIG. 1. These basic stages are as follows:
  Bale opening (10)
  Blending (20)
  Dosing (30)
  Carding (40)
  Cross laying (50)
  Drafting (60)
  Needle punching (70)
  Calendering (80)
  Application of chemicals by foaming (90)
  Pre-drying (100)
  Drum drying (110)
  Partial surface coating (120)
  Infrared heating (130)
  Cooling (140)
  Passing through cold calender (150)
  Winding (160)

The above mentioned stages include the stages until the production of semi-finished nonwoven starting from opening and blending the fibers and then intended insulation material of layer the present invention, i.e. the second layer (6). As stated above, the second layer (6) is a second protective layer laid on top of hood insulation material. As the following process details will describe, the second layer (6) of the insulation material of the present invention can be produced by applying particular processes (some of the aforementioned processes) to a semi-finished nonwoven (1) layer meeting the necessary conditions. In other words, the second layer (6) of the present invention can be produced from semi-finished nonwoven (1) as well as fibers. Moreover, while there can only be an inline production starting from the semi-finished or the main raw material to the end product, a plurality of production stages ("plurality" is used here because there are no limitations) can be produced in different conditions.

The production stages of the insulation material of the present invention, i.e. the second layer (6) are as follows:
Bale Opening (10) Stage
  In this stage, the fibers in bale form enter the bale opening unit. At least one of the fiber types such as polyester, viscose, bicomponent fiber, polyacrylonitrile oxide should enter.
Blending (20) Stage
  The fibers are mixed by the air in the blending unit.
Dosing (30) stage
  The blended fibers are dosed therein so that their average weight is between 40 and 150 gr/m$^2$. The weight per square meter may change depending on the structure of the first layer.
Carding (40) Stage
  In this stage, the fibers are made into web form in the carding machine.
Cross Laying (50) Stage
  In this stage, the webs are laid on top of each other in the cross layer.
Drafting (60) Stage
  In this stage, in order to improve the mechanical features of the cross-laid semi-finished web, the drafting procedure is applied in the drafting unit.
Needle Punching (70) Stage
  In this stage, the web form is needle punched in order to intertwine the fibers to provide mechanical bonding. Preferably, the hyper punch and the standard needle punch methods will be used together as the punching method.
Calendering (80) Stage
  In this stage, the needle punched fabric is passed through the hot calender in order to adjust its surface smoothness and thickness.
Application of Chemicals by Foaming (90) Stage
  In this stage, in order to provide the features of water repellency and/or flame retardancy, the nonwoven fabric is coated with chlorofluorocarbon and flame retardant materials (salt, organophosphate etc.).
  The chemical materials for water repellency and/or flame retardancy can be applied to the nonwoven fabric with either the kiss roll, the padding or the spray coating methods instead of the foam method.
Pre-Drying (100) Stage
  The water repellent and/or flame retardant coated nonwoven fabric is passed through the cylinders and is subjected to a partial drying by the removal of water.
Drum Drying (110) Stage
  The chemical material applied to the semi-finished is cross linked to the fabric surface by fixing in the drum dryer. The material is now a semi-finished nonwoven (1).
  If desired, semi-finished nonwoven (1) fabric can be prepared separately as in the state of the art until this stage and the processes comprising the critical superiorities of the product which are next stages, can be applied.

Partial Surface Coating (120) Stage

Figure 2:
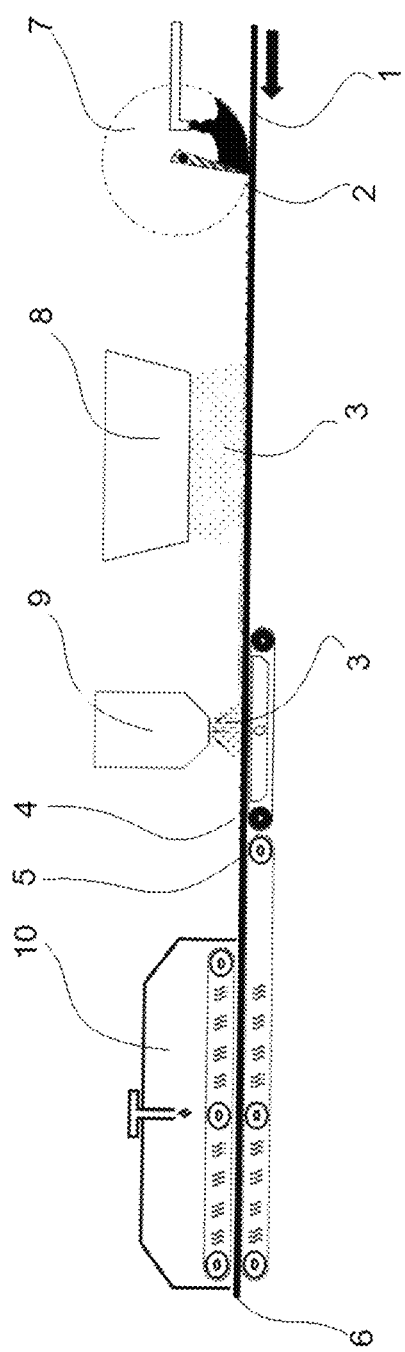
FIG. 2 is a drawing schematically showing how the semi-finished nonwoven fabric of the second layer of the insulator material of the present invention is coated with thermoplastic or thermoset materials in powder form and how a specific part of them is vacuumed.
Figure 3A:
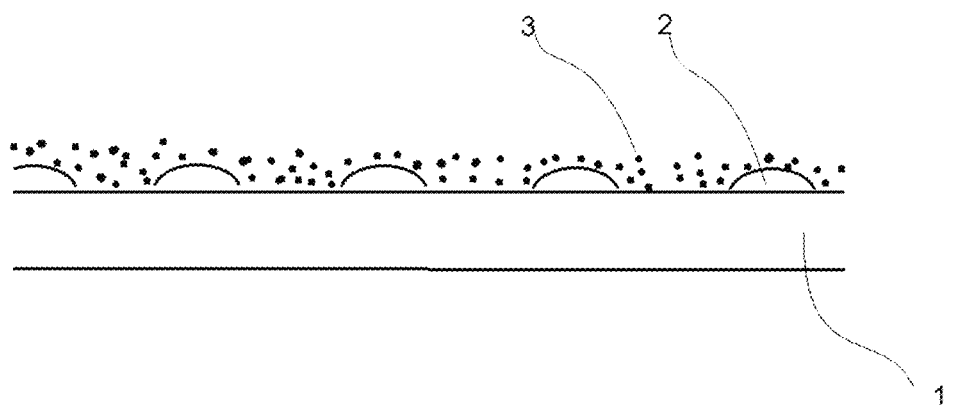
FIG. 3*a* is a drawing schematically showing the thermoplastic or thermoset materials scattered on the semi-finished nonwoven fabric of the second layer of the insulator material of the present invention.
Figure 3B:
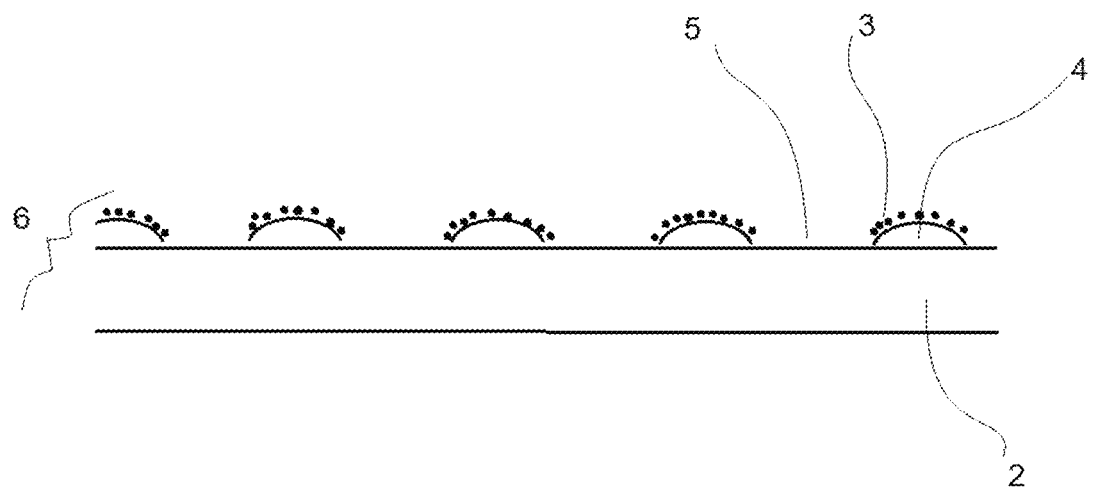
FIG. 3*b* is a drawing schematically showing the semi-finished nonwoven fabric of the second layer of the insulator material of the present invention after a specific part of these thermoplastic or thermoset materials is vacuumed.

After the drum drying stage, as shown in the representative production scheme in FIG. 2, the polymer emulsion is applied as in dotson the semi-finished nonwoven (1) fabric by rotary screen printing method (template, tram cylinder etc.) so that there are gaps in between. Preferably, the polymer emulsion will be done with acrylic (2). Pure acrylic will be used as the acrylic material. Alternatively, at least one of acrylic copolymers, SBR, NBR rubber materials (rubber polymers), EVA, VAE, HDPE and PU materials can be used. The partial application of the said acrylic material (2) (in the form of spots) to the surface is the key step. Thermoplastic and/or thermoset (3) is scattered in powder form on the whole surface of the acrylic coated semi-finished nonwoven (1) fabric. The powder coated semi-finished nonwoven fabric is represented in FIG. 3a. Polyethylene is the preferred substance as thermoplastic and phenol is the preferred substance as thermoset. In addition to Polyethylene (LDPE, LLDPE, HDPE, MDPE), at least one of CoPES, CoPA, TPU and EVA can be used as thermoplastic material. In addition to phenol; Epoxy, Polyurethane, Polyester, Melamine, Acrylic and Silicone groups can be used as thermoset. If desired, EPDM as an elastomer can be used as a third component alongside with the powders of thermoplastic and thermoset substances. Scattering thermoplastic and/or thermoset (3) in powder form on the whole surface is known as the "scattering method" in the state of the art. However, it is used for the first time in the automotive industry particularly in the production of hood insulators in the manner described below, and this is an important superiority of the invention. This superiority is that in the process or production, when thermoplastic and/or thermoset (3) in powder form is scattered on the surface, the thermoplastic and/or thermoset (3) is partially vacuumed. However, another feature of this vacuuming procedure is that the thermoplastic and/or thermoset (3) powder applied onto the acrylic material (2) powder is not vacuumed but only the free powder (acrylic uncoated part of the fabric that powder falls to the uncoated ground) is vacuumed. Therefore, only the thermoplastic and/or thermoset (3) powder scattered on the adhesive acrylic material (2) with the rotary screen printing method remains. This part is named acrylic-coated ridges (4) for a better understanding of the subject. The upper sections of these acrylic-coated ridges (3) comprise the thermoplastic and/or thermoset (4). Other parts are named as surfaces without acrylic (5) where the thermoplastic and/or thermoset is vacuumed. This surface appears to have spots. However, if desired, it may be formed in two different ways. This is shown in the representative drawing in FIG. 3b.

The semi-finished nonwoven (1) produced elsewhere can only start in the aforementioned stage, i.e. the partial surface coating (120) stage, and continue the process in order to become the second layer of the insulation material. The descriptions related to these will be given below.

Infrared Heating (130) Stage

In this stage, the semi-finished nonwoven (1) which partially has thermoplastic and/or thermoset (3) powder in the form of spots thereon is passed through the infrared heater and the powder is melted and adhered to the surface.

Cooling (140) Stage

In the previous stage, the thermoplastic and/or thermoset (3) powder was scattered on the semi-finished nonwoven (1) and the nonwoven adhered by these by going through the infrared heater is now cooled in the cooling cylinder.

Passing Through Cold Calender (150) Stage

The semi-finished nonwoven (1) material is passed through the cold calender under pressure and the second layer (6) of the insulation material with the thermoplastic and/or thermoset (preferably polyethylene and/or phenol) surface is obtained partially on the surface in the form of spots (in different forms if desired).

Winding (160) Stage

The second layer of the insulation material (6) is winded on the winding benches to be ready to be combined with the other layer.

Figure 4:
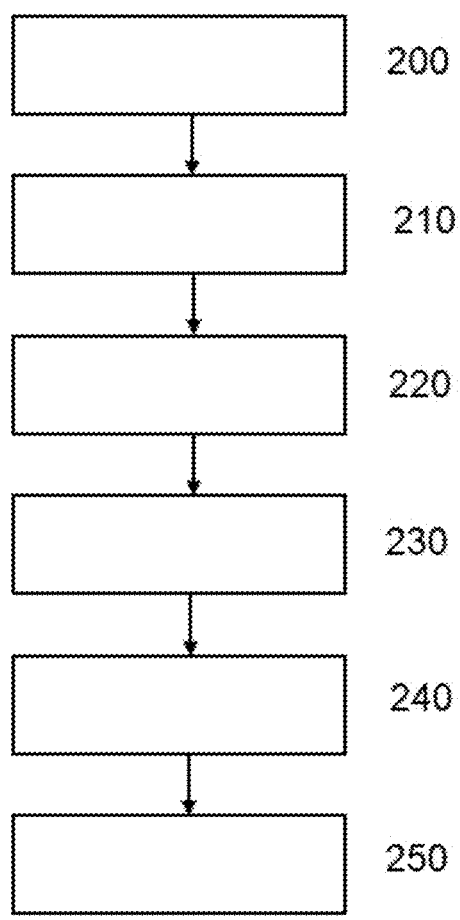
FIG. 4 is the flow chart of the production processes from the semi-finished nonwoven fabric of the second layer of the insulator material of the present invention to the end product.

In the aforementioned process, in addition to obtaining a semi-finished nonwoven (1) starting from a fiber raw material and the later procedures of the present invention, they can also be applied to an already produced semi-finished nonwoven (1) material. When the provision of the acrylic with the rotary screen printing method and then adding the thermoplastic and/or thermoset (3) in powder form with the scattering method (if desired, elastomers can also be added as mentioned above) to the semi-finished nonwoven (1) and the later procedures are handled as a separate process, the production method in the flow chart in FIG. 4 is defined. In other words, pure acrylic will be used as the acrylic material. However, if desired, alternatively, at least one of acrylic copolymers, SBR, NBR rubber materials (rubber polymers), EVA, VAE, HDPE and PU materials can be used. Again, in addition to Polyethylene (LDPE, LLDPE, HDPE, MDPE), at least one of CoPES, CoPA, TPU and EVA can be used as the thermoplastic material. In addition to phenol; Epoxy, Polyurethane, Polyester, Melamine, Acrylic and Silicone groups can be used. In addition to the thermoplastic and thermoset materials as powder groups, EPDM of elastomers can be used as a third group. Again, as stated above, pure acrylic will be used as the acrylic material. However, if desired, alternatively, at least one of acrylic copolymers, SBR, NBR rubber materials (rubber polymers), EVA, VAE, HDPE and PU materials can be used. Although this method is not a completely separate method, it can be handled as the procedures after carding and needle punching stages in an inline/continuous plant and making a semi-finished nonwoven (1) or after the production of the semi-finished nonwoven (1) in a separate plant. According to this, the flow chart of obtaining second layer of the insulation material (6) from a semi-finished nonwoven (1) can be defined as follows:

Application of acrylic on semi-finished nonwoven fabric (200)

Scattering the thermoplastic and/or thermoset powder on the acrylic coated semi-finished nonwoven fabric (210)

Vacuuming a part of the powder material from the thermoplastic and/or thermoset-coated semi-finished nonwoven fabric (220)

Fixing the thermoplastic and/or thermoset on the surface in the form of spots by heating (230)

Passing through cold calender and shaping (240)

Winding the second layer of the insulation material (250)

As stated above, this procedure is not a completely separate procedure. It just comprises a semi-finished nonwoven fabric that is already obtained. In other words, it comprises obtaining a semi-finished nonwoven by performing the stages comprising the production stage of the semi-finished nonwoven starting from the bale opening (10) stage, which comprises opening the fibers, to the partial surface coating (120) stage (not including partial surface coating (120)) in part or whole elsewhere. It shows obtaining the second layer of the insulation material (6) by providing the thermoplastic and/or thermoset (or elastomer) locally as desired on the semi-finished nonwoven (1). The details of the processes above are as follows.

Application of Acrylic on Semi-Finished Nonwoven Fabric (200)

It comprises the procedure of locally applied acrylic (2) with the rotary screen printing method (7) to the semi-finished nonwoven (1). The acrylic material (2) is generally a polymer emulsion. Pure acrylic will be used as the acrylic material. However, if desired, alternatively, at least one of acrylic copolymers, SBR, NBR rubber materials (rubber polymers), EVA, VAE, HDPE and PU materials can be used. The template (6), the tram cylinder and the like can be the alternatives for the rotary screen printing procedure. The template (6) is a system or a method comprising the chemical rotary screen printing method. For rotary screen printing application the suitable systems will be selected as stated in the state of the art. This locally applied acrylic (2) is preferably in the form of acrylic-coated ridges (4).

Scattering the Thermoplastic and/or Thermoset Powder on the Acrylic Coated Semi-Finished Nonwoven Fabric (210)

All semi-finished nonwoven (1) including the locally acrylic (2) coated surface is provided with the thermoplastic and/or thermoset (3) scattering. Polyethylene is the preferred substance as thermoplastic and phenol is the preferred substance as thermoset. However, as mentioned above, in addition to Polyethylene (LDPE, LLDPE, HDPE, MDPE), at least one of CoPES, CoPA, TPU and EVA can be used as the thermoplastic material. In addition to phenol as thermoset, Epoxy, Polyurethane, Polyester, Melamine, Acrylic and Silicone groups can be used. In addition to the thermoplastic and thermoset materials as powder groups, EPDM of elastomers and/or polyurethane can be used as a third group, if desired. This powder scattering procedure will be carried out with the scattering method. In this procedure, the provision of the thermoplastic and/or thermoset (3) only to the acrylic material (2) is provided by making the other regions without thermoplastic and/or thermoset (3) free. The powder scattering procedure is carried out in the powder scattering unit (8).

Vacuuming a Part of the Powder Material from the Thermoplastic and/or Thermoset-Coated Semi-Finished Nonwoven Fabric (220)

The thermoplastic and/or thermoset (3) material which is not adhered to the acrylic material (2) or loose on the surface of the semi-finished nonwoven (1) is vacuumed and removed from the region. The vacuuming procedure is carried out in the vacuuming unit (9). Therefore, the region comprises both the surfaces without acrylic (5) and the regions without the thermoplastic and/or thermoset (3) materials.

Hence, this allows obtaining the desired material which is lighter and cheaper, has less thermoplastic and/or thermoset and a minimized carcinogenic effect but provides the same insulation efficiency.

Fixing the Thermoplastic and/or Thermoset Dots on the Surface by Heating (230)

The thermoplastic and/or thermoset (3) coating obtained on the acrylic-coated ridges (4) which are on a part of the said semi-finished nonwoven (1) are made permanent by being fixed in the infrared or stenter frame by entering the infrared heater after the partial surface coating procedure of the semi-finished nonwoven (1) material. The fixing procedure is carried out in the infrared oven (10). The temperature therein may change between 120 and 220° C. and the time between 0.5 and 5 minutes.

Passing Through Cold Calender and Shaping (240)

The second layer of the insulation material (6) partially coated with the thermoplastic and/or thermoset (3) is provided to be cold and permanent by being passed through the cold calender.

Winding the Second Layer of the Insulation Material (250)

The second layer of the insulation material (6) is ready for shipment after winding in the winding machines or, if desired, for being transported to be wrapped with another material.

The aforementioned process allows obtaining the second layer of the insulation material with the desired features by carding and needle punching the fibers and producing a semi-finished nonwoven (1) and then partially coating this surface with polyethylene or phenol, or partially coating a semi-finished nonwoven (1) fabric produced elsewhere with polyethylene or phenol by the said process.

Application of the Invention in the Industry

The second layer of the insulation material of the present invention can be used essentially in the automotive industry, particularly as a sound and heat insulation material in engine hoods. However, it can also be used in other fields such as major appliances, in fields where heating, cooling or sound is produced.

The invention claimed is:

1. A method for producing an engine hood insulator material, the method comprising:
    mixing fibers in a blending unit such that the fibers are blended;
    dosing the blended fibers such that the weight of the dosed blended fibers is between 40 g/m$^2$ and 150 g/m$^2$;
    carding the dosed blended fibers so that the dosed blended fibers are of a plurality of web forms;
    crossing-laying the plurality of web forms on top of one another;
    drafting the cross-laid plurality of web forms in a draft unit;
    needle punching the drafted cross-laid plurality of web forms in a needle punching unit so as to entangle the fibers;
    passing the needle-punched plurality of web forms through a hot calendar so as to adjust a surface smoothness and thickness;
    coating the hot-calendared plurality of web forms with a chlorfluorocarbon or flame retardant material in a foam machine in order to provide water repellency or flame retardancy;
    passing the coated hot-calendared plurality of web forms through cylinders so as to provide a pre-dried material;
    fixing the pre-dried material in a drum dyer so as to chemically cross-link the pre-dried material and to produce a semi-finished non-woven material;
    applying a polymer emulsion in dots over an entire surface of the semi-finished non-woven material with rotary screen printing;
    scattering a thermoplastic or thermoset or an elastomer powder onto the dots of the polymer emulsion such that the thermoplastic or thermoset or elastomer powder is retained by the dots;
    removing excess powder between the dots;
    infrared heating the semi-finished non-woven material so that the scattered thermoplastic or thermoset or elastomer powder is melted in an infrared oven so as to adhere to the dots on the entire surface of the semi-finished non-woven material;
    passing the infrared-heated semi-finished non-woven material through cooling cylinders so as to cool the melted spots of thermoplastic or thermoset or elastomer powder to adhere to the surface of the semi-finished non-woven material;

cold calendaring the semi-finished non-woven material under pressure so as to obtain a layer of the engine hood insulator material; and winding the layer of engine hood insulator material on winding benches.

2. The method of claim 1, wherein the fibers are selected from the group consisting of polyester fibers, viscose fibers, bicomponent fibers, polyacrylonitrile oxide fibers and combinations thereof.

3. The method of claim 1, wherein the step of needle punching is hyper-punching.

4. The method of claim 1, wherein the step of coating is carried out with a kiss roll.

5. The method of claim 1, wherein the polymer emulsion is a pure acrylic.

6. The method of claim 1, wherein the acrylic material is an acrylic copolymer.

7. The method of claim 1, wherein the polymer emulsion is selected from the group consisting of SBR, rubber polymers, EVA, VAE, HDPE and PU.

8. The method of claim 7, wherein the thermoplastic powder is polyethylene.

9. The method of claim 8, wherein the thermoset powder is phenol.

10. The method of claim 1, wherein the thermoplastic is selected from the group consisting of polyethylene, copolyesters, polyurethane and ethylene vinyl acetate.

11. The method of claim 1, wherein the thermoset powder is selected from the group consisting of a phenol, an epoxy, a polyurethane, a polyester, a melamine, an acrylic, and a silicone.

12. The method of claim 1, wherein the elastomer powder is EPDM.

13. The method of claim 1, further comprising:

vacuuming the thermoplastic or thermoset or elastomer powder after the step of scattering.

14. The method of claim 1, wherein the infrared oven has a temperature of between 120° C. and 220° C., wherein the semi-finished non-woven material is maintained in the infrared oven for a time period of between 0.5 minutes and five minutes.

* * * * *